(12) United States Patent
Huang et al.

(10) Patent No.: US 10,382,795 B2
(45) Date of Patent: Aug. 13, 2019

(54) METHOD OF VIDEO CODING USING BINARY TREE BLOCK PARTITIONING

(71) Applicant: MediaTek Singapore Pte. Ltd., Singapore (SG)

(72) Inventors: Han Huang, San Jose, CA (US); Jicheng An, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/830,392

(22) Filed: Dec. 4, 2017

(65) Prior Publication Data

US 2018/0098097 A1    Apr. 5, 2018

Related U.S. Application Data (63) Continuation-in-part of application No. 15/532,166, filed as application No. PCT/CN2015/096761 on Dec. 9, 2015, now Pat. No. 9,843,804.

(51) Int. Cl.
*H03M 7/00* (2006.01)
*H04N 19/96* (2014.01)
(Continued)

(52) U.S. Cl.
CPC .......... *H04N 19/96* (2014.11); *H04N 19/105* (2014.11); *H04N 19/119* (2014.11);
(Continued)

(58) Field of Classification Search
CPC .......... G02B 27/146; G06T 9/00; G06T 9/20; H04N 19/159; H04N 19/11; H04N 19/119; H04N 19/96; H04N 19/122
(Continued)

(56) References Cited

U.S. PATENT DOCUMENTS

| 6,584,226 B1 | 6/2003 | Chaddha et al. |
| 8,750,634 B2 | 6/2014 | Cohen et al. |

(Continued)

FOREIGN PATENT DOCUMENTS

| CN | 101459847 A | 6/2009 |
| CN | 101990104 A | 3/2011 |

(Continued)

OTHER PUBLICATIONS

International Search Report dated Jan. 27, 2016, issued in application No. PCT/CN2015/096761.

(Continued)

*Primary Examiner* — Joseph J Lauture
(74) *Attorney, Agent, or Firm* — McClure, Qualey & Rodack, LLP (57) ABSTRACT

A method and apparatus of video coding using block partitioning process including a binary tree partitioning process are disclosed. The block partitioning structure corresponding to the block partitioning process for a block of video data is derived by parsing a first indicator associated with a current block and determining whether the binary tree partitioning process applies a binary tree partition to the current block based on a value of the first indicator. When it is determined that the binary tree partition is applied to the current block, the current block is always split into two primary sub-blocks with same size or two primary sub-blocks with different sizes. The block partitioning structure represents partitioning the block of video data into final sub-blocks. The block of video data is decoded based on the final sub-blocks decoded according to the block partitioning structure derived.

31 Claims, 7 Drawing Sheets

(51) Int. Cl.
*H04N 19/105* (2014.01)
*H04N 19/174* (2014.01)
*H04N 19/119* (2014.01)
*H04N 19/176* (2014.01)
*H04N 19/70* (2014.01)
*H04N 19/11* (2014.01)
*H04N 19/122* (2014.01)
*G06T 9/20* (2006.01)
*G02B 27/14* (2006.01)
*G06T 9/00* (2006.01)

(52) U.S. Cl.
CPC ......... *H04N 19/174* (2014.11); *H04N 19/176* (2014.11); *H04N 19/70* (2014.11); *G02B 27/146* (2013.01); *G06T 9/00* (2013.01); *G06T 9/20* (2013.01); *H04N 19/11* (2014.11); *H04N 19/122* (2014.11)

(58) Field of Classification Search
USPC ............... 341/79; 382/232, 233; 375/240.12, 375/240.13
See application file for complete search history.

(56) References Cited

U.S. PATENT DOCUMENTS

| | | |
|---|---|---|
| 2011/0249743 A1 | 10/2011 | Zhao et al. |
| 2011/0310976 A1 | 12/2011 | Wang et al. |
| 2012/0128070 A1 | 5/2012 | Kim et al. |
| 2014/0029670 A1 | 1/2014 | Kung et al. |
| 2015/0146782 A1 | 5/2015 | Lei et al. |
| 2015/0201212 A1 | 7/2015 | Zhang |
| 2018/0063528 A1* | 3/2018 | An ................. H04N 19/176 |

FOREIGN PATENT DOCUMENTS

| | | |
|---|---|---|
| CN | 102118615 A | 7/2011 |
| CN | 102801976 A | 11/2012 |
| CN | 103024373 A | 4/2013 |
| CN | 103299634 A | 9/2013 |
| CN | 103503461 A | 1/2014 |
| GB | 2 505 408 A | 3/2014 |
| WO | 2011/160010 A1 | 12/2011 |
| WO | 2012/065552 A1 | 5/2012 |
| WO | 2013023005 A1 | 2/2013 |
| WO | 2014/078068 A1 | 5/2014 |

OTHER PUBLICATIONS

Luo, Y., et al.; "Fast Binary Partition Tree Based Variable-Size Block-Matching For Video Coding;" IEEE; 2009; pp. 609-612.
Mediatek Inc.; "Block partitioning structure for next generation video coding;" Telecommunication Standardization Sector; Sep. 2015; pp. 1-7.
Chan, M.H., et al.; "Variable Size Block Matching Motion Compensation With Applications to video coding;" IEE Proceedings; vol. 137; Pt. 1; No. 4; Aug. 1990; pp. 205-212.
Luo, Y., et al.; "Fast binary partition tree based variable-size block-matching for video coding;" IEEE; Nov. 2009; pp. 609-612.
Kim, I.K., et al.; "Block partitioning structure in the HEVC standard;" IEEE Transactions on Circuits and Systems for Video Technology; vol. 22; No. 12; Dec. 2012; pp. 1697-1706.

* cited by examiner

Fig. 8 ively. Every

METHOD OF VIDEO CODING USING BINARY TREE BLOCK PARTITIONING

CROSS REFERENCE TO RELATED APPLICATIONS

This application is a Continuation-In-Part of pending U.S. patent application Ser. No. 15/532,166, filed Jun. 1, 2017 and entitled "METHOD OF VIDEO CODING USING BINARY TREE BLOCK PARTITIONING", now U.S. Pat. No. 9,843,804, which is a national stage of PCT/CN2015/096761, filed Dec. 9, 2015 and claimed priority to PCT Patent Application Serial No. PCT/CN2014/093445, filed on Dec. 10, 2014. The entireties of these priority applications are hereby incorporated by reference in its entirety.

TECHNICAL FIELD

The present invention relates to video coding. In particular, the present invention relates to coding techniques associated with coding tree design including a binary tree partitioning process for partitioning an image area for different processing such as a coding tree unit (CTU), coding unit (CU), prediction unit (PU) and transform unit (TU).

BACKGROUND

HEVC is an advanced video coding system developed under the Joint Collaborative Team on Video Coding (JCT-VC) group of video coding experts from ITU-T Study Group (High Efficiency Video Coding, Recommendation ITU-T H.265, Series H: Audiovisual And Multimedia Systems, Infrastructure of Audiovisual Services—Coding of Moving Video, International Telecommunication Unit, April, 2013). In HEVC, one slice is partitioned into multiple coding tree units (CTU). For color video data, each CTU consists of multiple coding tree blocks corresponding to the color components. In main profile, the minimum and the maximum sizes of CTU are specified by the syntax elements in the sequence parameter set (SPS) among the sizes of 8×8, 16×16, 32×32, and 64×64. For each slice, a raster scan traversing through the slice is used for processing the CTU.

The CTU is further partitioned into multiple coding units (CU) to adapt to various local characteristics. A quadtree denoted as the coding tree is used to partition the CTU into multiple CUs. Let CTU size be M×M where M is one of the values of 64, 32, or 16. The CTU can be a single CU or can be split into four smaller units of equal sizes of M/2×M/2, which are nodes of coding tree. If units are leaf nodes of coding tree, the units become CUs. Otherwise, the quadtree splitting process can be iterated until the size for a node reaches an allowed minimum CU size specified in the SPS (sequence parameter set).

Figure 1A:
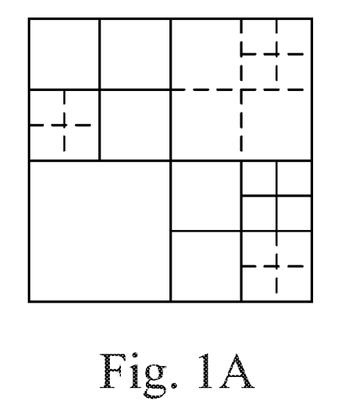
FIG. 1A illustrates an example of quadtree partitioning process according to the HEVC (high efficiency video coding) standard to partition a CTU (coding tree unit) into CUs (coding units) as shown in solid lines and to partition a CU into TUs (transform units) as shown in dashed lines.
Figure 1B:
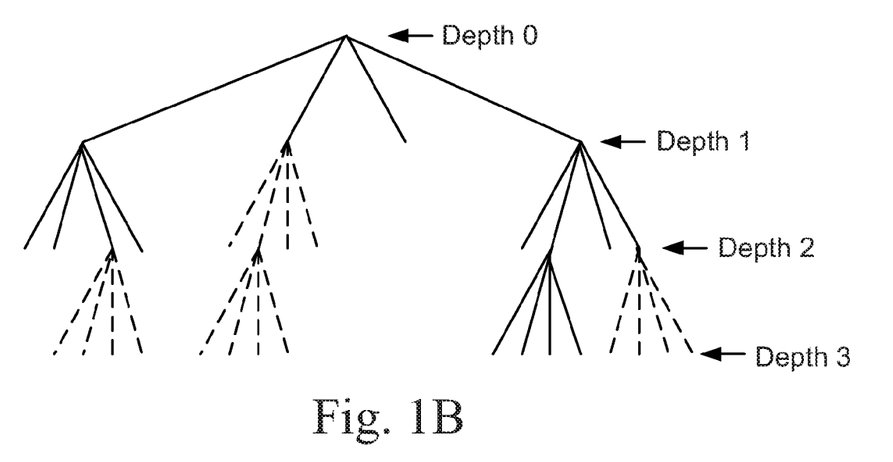
FIG. 1B illustrates an example of a partitioning tree correspond to the partitioning structure in FIG. 1A.

FIG. 1A illustrates an example of partitioning result for a CU using the quadtree partition process recursively. Every time when a block is partitioned by a quadtree, the original block is split into four sub-blocks. In the next level, the sub-block becomes a new block to be further partitioned. The partitioning process may decide not to split a block. In this case, the block is not further partitioned. The partitioning process may be terminated when a minimum quadtree block size is reached. In some cases, the partitioning process may be terminated when the partition depth reaches a maximum value. The final sub-blocks in solid lines having various block sizes as shown in FIG. 1A correspond to the boundaries of coding units generated from the partitioning process. This partition process results in a recursive structure representing the partition decisions as shown in FIG. 1B and the tree-like structure in solid lines is called a coding tree, where each leaf node corresponds to a CU (i.e., one final sub-block). The decision whether to code a picture area using inter-picture (temporal) or intra-picture (spatial) prediction is made at the CU level. In HEVC, the minimum CU size can be 8×8. Therefore, the minimum granularity for switching different prediction type is 8×8.

Figure 2:
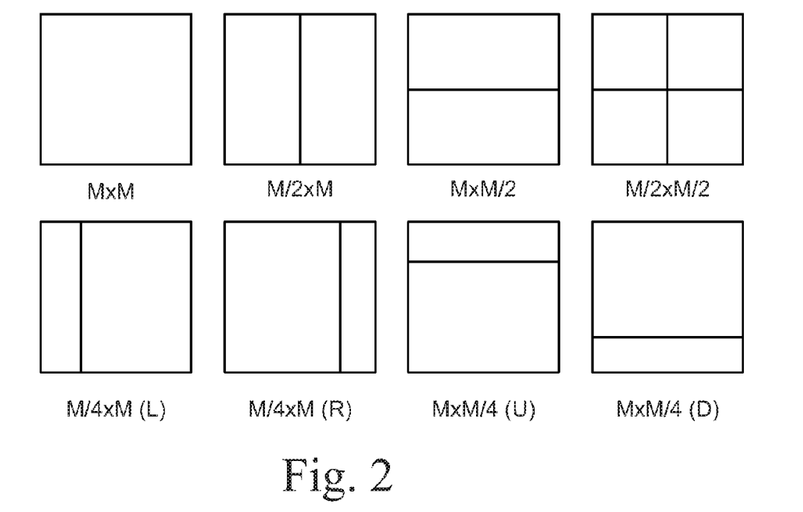
FIG. 2 illustrates the available partition types for partitioning a PU (prediction unit) according to the HEVC (high efficiency video coding) standard.

For prediction process (e.g. inter prediction or intra prediction), each CU is further partitioned into one or more prediction units (PUs). Coupled with the CU, the PU works as a basic representative block for sharing the prediction information. Inside one PU, the same prediction process is applied and the relevant information is transmitted to the decoder on a PU basis. A CU can be split into one, two or four PUs according to the PU splitting type. HEVC defines eight shapes for splitting a CU into one or more PUs as shown in FIG. 2. Unlike the CU, the PU may be split only once. In FIG. 2, the lower four partitions correspond to asymmetric partition.

After obtaining the residual block for a CU by applying the prediction process to the one or more PUs generated by the splitting process, a CU can be partitioned into transform units (TUs) according to another quadtree structure similar to the coding tree for the CU. In FIG. 1A, the dotted lines indicate the resulting TU boundaries by quadtree partition of each CU. The TU is a basic representative block having residual or transform coefficients for applying the integer transform and quantization. For each TU, one integer transform having the same size as the TU is applied to obtain residual coefficients. These coefficients are transmitted to the decoder after quantization on a TU basis.

The terms, coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

The same tree partitioning is generally applied to both luma and chroma components, although exceptions may apply when certain minimum sizes are reached for chroma.

The current HEVC block partitioning only uses the quadtree based partitioning to partition a CTU to CU and to partition a CU to TU in a recursive fashion until a limit is reached. On the other hand, the current HEVC allowed up to 8 partition types for the PU. However, the PU partition is only performed once for each PU. Therefore, it is desirable to further improve the coding efficiency to meet the needs of ever increasing storage and transmission of video contents.

SUMMARY

According to embodiments of the invention, a method of video decoding is provided. The method includes the step of receiving a video bitstream including coded data for a block of video data and deriving, from the video bitstream, a block partitioning structure corresponding to a block partitioning process including a binary tree partitioning process for the block of video data. The block partitioning structure represents partitioning the block of video data into final sub-blocks. The step of deriving the block partitioning structure for the block comprises parsing a first indicator associated with a current block; and determining whether the binary tree partitioning process applies a binary tree partition to the current block based on a value of the first indicator, wherein when it is determined that the binary tree partition is applied to the current block, the current block is always split into two primary sub-blocks with same size or two primary sub-blocks with different sizes. The method further comprises step of decoding the final sub-blocks based on the video bitstream and decoding the block of video data based on the final sub-blocks decoded according to the block partitioning structure derived.

In some embodiments, binary tree partition types associated with the binary tree partition comprises at least two of symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side. In some embodiments, a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

In some embodiments, the two primary sub-blocks with different sizes correspond to a first primary sub-block and a second primary sub-block, and the second primary sub-block comprises a first inferior sub-block and a second inferior sub-block. In some embodiments, the first primary sub-block corresponds to the narrower upper side, the narrower lower side, the narrower left side or the narrower right side of the current block, and the first primary sub-block and the first inferior sub-block have identical size. In some embodiments, a second indicator is used for the current block to indicate a binary tree partition type associated with the binary tree partition when the binary tree partition is applied to the current block.

In some embodiments, the block of video data corresponds to a coding tree unit (CTU) and the final sub-blocks associated with leaf nodes of the block partitioning structure correspond to coding units (CUs). In some embodiments, all CUs are used for prediction process and/or transform process respectively without any further explicit partitioning process. In some embodiments, the block of video data for luma component and non-luma components in an I-slice uses individual block partitioning process or the block of video data for two chroma components in an I-slice uses individual block partitioning process. In some embodiments, the block partitioning process further includes a quadtree partitioning process, wherein when the quadtree partitioning process decides to apply quadtree partition to one given block, said one given block is always split into four sub-blocks.

In some embodiments, the quadtree partitioning process is firstly applied to the block of video data recursively before the binary tree partitioning process to generate quadtree leaf nodes, and the binary tree partitioning process is applied to one of the quadtree leaf nodes or not based on the first indicator associated with said one of the quadtree leaf nodes. In some embodiments, a binary tree partition type associated with the two primary sub-blocks with same size is a symmetric horizontal partition or a symmetric vertical partition, and a binary tree partition type associated with the two primary sub-blocks with different sizes is one of a asymmetric horizontal partition with narrower upper side, a asymmetric horizontal partition with narrower lower side, a asymmetric vertical partition with narrower left side and a asymmetric vertical partition with narrower right side.

In some embodiments, the two primary sub-blocks with different sizes correspond to a first primary sub-block and a second primary sub-block, and the second primary sub-block comprises a first inferior sub-block and a second inferior sub-block. In some embodiments, wherein the first primary sub-block corresponds to the narrower upper side, the narrower lower side, the narrower left side or the narrower right side of the current block, and the first primary sub-block and the first inferior sub-block have identical size. In some embodiments, the quadtree partitioning process for a selected node is implicitly terminated when the selected node reaches a minimum allowed quadtree leaf node size or quadtree depth associated with the selected node reaches a maximum allowed quadtree depth. In some embodiments, the minimum allowed quadtree leaf node size, the maximum allowed quadtree depth are specified in high level syntax including sequence parameter set (SPS), picture parameter set (PPS) or slice header.

In some embodiments, the block of video data and the final sub-blocks correspond to coding tree unit (CTU) and coding units (CUs) respectively. In some embodiments, all CUs are used for prediction process and/or transform process respectively without any further explicit partitioning process. In some embodiments, the block of video data and the final sub-blocks correspond to picture and coding tree units (CTUs) respectively, slice and CTUs respectively, coding unit (CU) and prediction units (PUs) respectively, coding unit (CU) and transform units (TUs) respectively, or prediction unit (PU) and transform units (TUs) respectively.

According to embodiments of the invention, a method of video encoding is provided. The method includes the steps of receiving input data associated with a block of video data, and determining a block partitioning structure corresponding to a block partitioning process including a binary tree partitioning process for the block of video data. The block partitioning structure represents partitioning the block of video data into final sub-blocks. The step of determining the block partitioning structure for the block includes incorporating a first indicator associated with a current block into a video bitstream. The first indicator indicates whether the binary tree partitioning process applies a binary tree partition to the current block, wherein when it is determined that the binary tree partition is applied to the current block, the current block is always split into two primary sub-blocks with same size or two primary sub-blocks with different sizes. The method further includes the steps of applying an encoding process comprising prediction process, transform process or both to the block of video data by applying the encoding process at a level corresponding to the final sub-blocks.

In some embodiments, binary tree partition types associated with the binary tree partition comprises at least two of symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side. In some embodiments, a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

In some embodiments, the two primary sub-blocks with different sizes correspond to a first primary sub-block and a second primary sub-block, and the second primary sub-block comprises a first inferior sub-block and a second inferior sub-block. In some embodiments, the first primary sub-block corresponds to the narrower upper side, the narrower lower side, the narrower left side or the narrower right side of the current block, and the first primary sub-block and the first inferior sub-block have identical size.

In some embodiments, a second indicator is used for the current block to indicate a binary tree partition type associated with the binary tree partition when the binary tree partition is applied to the current block. In some embodiments, the block of video data corresponds to a coding tree unit (CTU) and the final sub-blocks associated with leaf nodes of the block partitioning structure correspond to coding units (CUs), and all CUs are used for prediction process and/or transform process respectively without any further explicit partitioning process. In some embodiments, the block partitioning process further includes a quadtree partitioning process, wherein when the quadtree partitioning process decides to apply quadtree partition to one given block, said one given block is always split into four sub-blocks.

In some embodiments, the quadtree partitioning process is firstly applied to the block of video data recursively before the binary tree partitioning process to generate quadtree leaf nodes, and the binary tree partitioning process is applied to one of the quadtree leaf nodes or not based on the first indicator associated with said one of the quadtree leaf nodes. In some embodiments, a binary tree partition type associated with the two primary sub-blocks with same size is a symmetric horizontal partition or a symmetric vertical partition, and a binary tree partition type associated with the two primary sub-blocks with different sizes is one of a asymmetric horizontal partition with narrower upper side, a asymmetric horizontal partition with narrower lower side, a asymmetric vertical partition with narrower left side and a asymmetric vertical partition with narrower right side.

In some embodiments, the two primary sub-blocks with different sizes correspond to a first primary sub-block and a second primary sub-block, and the second primary sub-block comprises a first inferior sub-block and a second inferior sub-block. In some embodiments, the first primary sub-block corresponds to the narrower upper side, the narrower lower side, the narrower left side or the narrower right side of the current block, and the first primary sub-block and the first inferior sub-block have identical size. In some embodiments, the block of video data and the final sub-blocks correspond to coding tree unit (CTU) and coding units (CUs) respectively, and all CUs are used for prediction process and/or transform process respectively without any further explicit partitioning process.

According to embodiments of the invention, an apparatus for video decoding is provided. The apparatus includes one or more electronic devices configured to receive a video bitstream including coded data for a block of video data and derive, from the video bitstream, a block partitioning structure corresponding to a block partitioning process including a binary tree partitioning process for the block of video data. The block partitioning structure represents partitioning the block of video data into final sub-blocks, and wherein the step of deriving the block partitioning structure for the block comprises parsing a first indicator associated with a current block and determining whether the binary tree partitioning process applies a binary tree partition to the current block based on a value of the first indicator. When it is determined that the binary tree partition is applied to the current block, the current block is always split into two primary sub-blocks with same size or two primary sub-blocks with different sizes. The one or more electronic devices is further configured to decode the final sub-blocks based on the video bitstream and decode the block of video data based on the final sub-blocks decoded according to the block partitioning structure derived.

According to embodiments of the invention, an apparatus for video encoding is provided. The apparatus includes one or more electronic devices configured to receive input data associated with a block of video data and determine a block partitioning structure corresponding to a block partitioning process including a binary tree partitioning process for the block of video data. The block partitioning structure represents partitioning the block of video data into final sub-blocks. The step of determining the block partitioning structure for the block comprises incorporating a first indicator associated with a current block into a video bitstream. The first indicator indicates whether the binary tree partitioning process applies a binary tree partition to the current block. When it is determined that the binary tree partition is applied to the current block, the current block is always split into two primary sub-blocks with same size or two primary sub-blocks with different sizes. The one or more electronic devices is further configured to apply an encoding process comprising prediction process, transform process or both to the block of video data by applying the encoding process at a level corresponding to the final sub-blocks.

According to embodiments of the invention, a non-transitory computer readable medium is provided. When the computer-executable program is executed, it causes a decoder to perform the following steps of receiving a video bitstream including coded data for a block of video data and deriving, from the video bitstream, a block partitioning structure corresponding to a block partitioning process including a binary tree partitioning process for the block of video data. The block partitioning structure represents partitioning the block of video data into final sub-blocks. The step of deriving the block partitioning structure for the block includes parsing a first indicator associated with a current block, and determining whether the binary tree partitioning process applies a binary tree partition to the current block based on a value of the first indicator. When it is determined that the binary tree partition is applied to the current block, the current block is always split into two primary sub-blocks with same size or two primary sub-blocks with different sizes. When the computer-executable program is executed, it also causes the decoder to perform decoding the final sub-blocks based on the video bitstream, and decoding the block of video data based on the final sub-blocks decoded according to the block partitioning structure derived.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
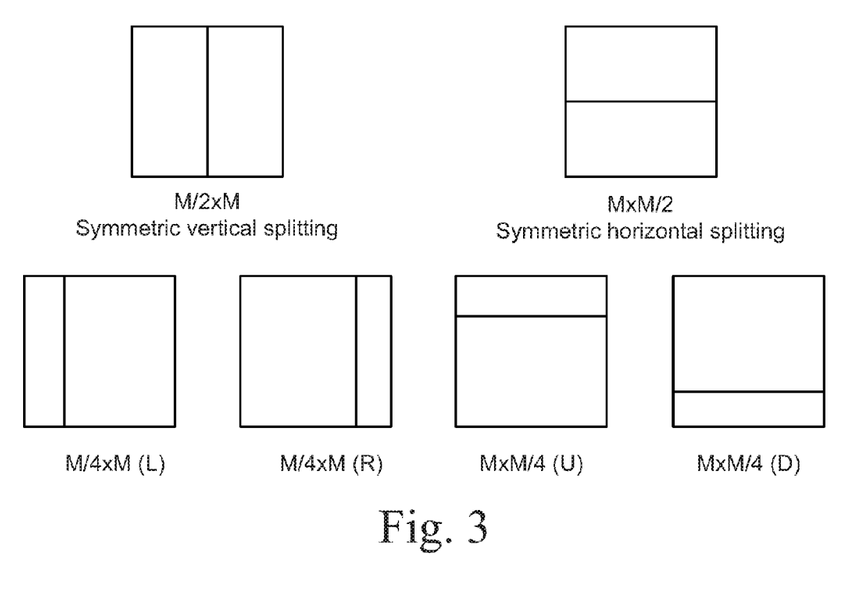
FIG. 3 illustrates an example of available partition types for the binary tree partitioning process according to an embodiment of the present invention.

In the present invention, a binary tree block partitioning process is disclosed. According to one embodiment of the present invention, the binary tree partitioning process can be applied to a block recursively. Every time when the binary tree partitioning process decides to partition a given block, the given block is always split into two smaller blocks, which are also referred as sub-blocks in this disclosure. Exemplary splitting types according to one embodiment are shown in FIG. 3, which includes two symmetric binary tree partitioning types and four asymmetric binary tree partitioning types. The symmetric horizontal and vertical splitting types are the simplest splitting types and often achieve the good coding efficiency. Therefore, in one embodiment, only these two symmetric binary tree partitioning types are used. For a given block of size M×N, a flag can be signaled to indicate whether the block is split into two smaller blocks. If yes, a second syntax element is signaled to indicate which splitting type is used. If the horizontal splitting is used then it is split into two blocks of size M×N/2. If the vertical splitting is used, the block is split into two blocks of size M/2×N. In the embodiment shown in FIG. 3, M is equal to N, but the present invention is not limited thereto.

According to the present invention, the binary tree splitting process can be iterated until the size (width or height) for a splitting block reaches a minimum allowed block size (width or height) or the binary tree partitioning process reaches a maximum allowed binary tree depth. The minimum allowed block size can be specified in high level syntax such as SPS (sequence parameter set), PPS (picture parameter set) or slice header. However, the present invention is not limited thereto. Since the binary tree has two splitting types (i.e., horizontal and vertical), the minimum allowed block width and height are both indicated. In some cases, the second syntax element to indicate which splitting type is used can be inferred and there is no need to signal the second syntax element. For example, if a block with a width equal to the minimum allowed block width is split, the splitting type must be horizontal partition. If vertical partition were applied, it would result in sub-blocks having block width smaller than the minimum allowed block width. Therefore, horizontal splitting is implicit when vertical splitting would result in a block width smaller than the indicated minimum. Similarly, vertical splitting is implicit when horizontal splitting would result in a block height smaller than the indicated minimum height.

Figure 4A:
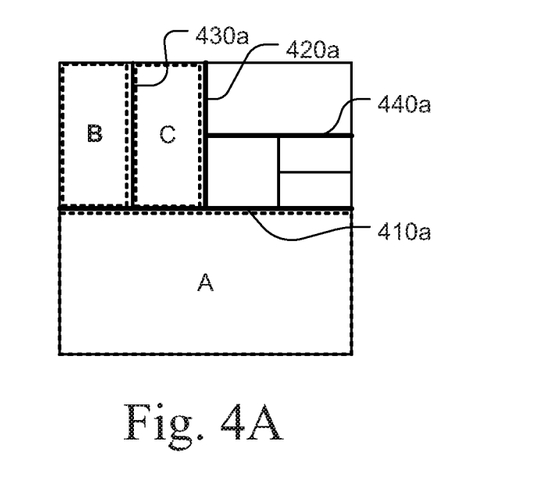
FIG. 4A illustrates an example of binary tree partitioning process according to an embodiment of the present invention to partition a block of video data into final sub-blocks for the coding process comprising prediction process, transform process or both.
Figure 4B:
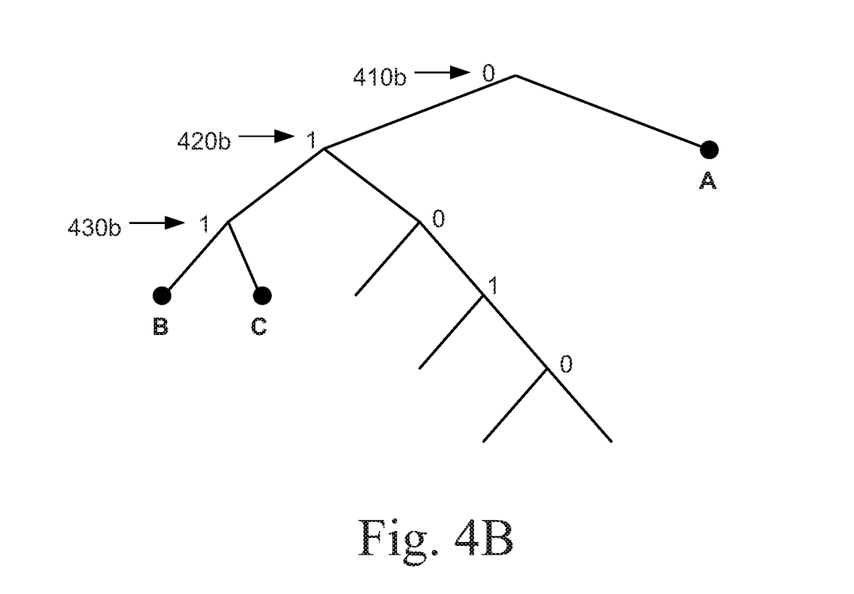
FIG. 4B illustrates an example of a partitioning tree correspond to the partitioning structure in FIG. 4A.

FIG. 4A illustrates an example of block partitioning process using binary tree to partition a block into final sub-blocks and FIG. 4B illustrates its corresponding partitioning tree (which is a binary tree in this embodiment). In this example, the partition types consist of two types corresponding to symmetric horizontal partition and vertical partition. In each splitting (i.e., non-leaf node of the binary tree), one flag indicating the splitting type (i.e., horizontal or vertical) is signaled, where 0 indicates horizontal splitting and 1 indicates vertical splitting. Each final sub-block corresponds to one binary tree leaf node. In other words, the number of final sub-blocks in FIG. 4A is the same as the number of leaf nodes of the binary tree.

The first few partition steps are shown in details. In the first step, the binary tree partitioning process decides to partition the initial block (i.e., the root node for the binary tree partition) using horizontal partition, which split the block into two sub-blocks corresponding to the upper half and the lower half. The first horizontal partition is indicated by a horizontal line (410a) in FIG. 4A. A "0" (410b) is assigned to the root node to indicate the corresponding partition process. The partition process decides not to further split the lower half (labelled as sub-block "A" in FIG. 4A) and the lower half is not subject to any further split. Therefore, the sub-block "A" is a final sub-block. In the next step, the upper half is partitioned by vertical partition (420a) to split the upper half into an upper-left sub-block and upper-right sub-block. A "1" (420b) is assigned to the corresponding binary tree node to indicate the vertical partition. In FIG. 4B, the convention has adopted to designate a left branch for a left sub-block in case of vertical partition or an upper sub-block in case of horizontal partition. As shown in FIG. 4A, another vertical partition (430a) is applied to the upper-left sub-block to generate sub-blocks "B" and "C". Since sub-blocks "B" and "C" are not subject to further split, sub-blocks "B" and "C" are final sub-blocks. A "1" (430b) is assigned to the corresponding binary tree node. The sub-blocks "B" and "C" correspond to two binary tree leaf nodes as indicated in FIG. 4B. FIGS. 4A and 4B are intended to illustrate one example of binary tree partitioning process according to an embodiment of the present invention. The present invention is not limited to the example in FIG. 4A and FIG. 4B.

The binary tree structure disclosed above can be used for partitioning a block into multiple smaller blocks (i.e., sub-blocks) such as partitioning a picture into CTUs, a slice into CTUs, a CTU into CUs, a CU into PUs, a CU into TUs, or a PU into TUs, and so on. In one embodiment, the binary tree is used for partitioning a CTU into CUs, i.e., the root node of the binary tree being a CTU and the leaf nodes of the binary tree are CUs. The leaf nodes are further processed by prediction and transform coding. In one embodiment, there is no further explicit partitioning from the CU to the PU or from the CU to the TU to simplify the coding process. Therefore, the CU is also used as the PU and the TU. In other words, the leaf nodes of the binary tree are the basic units for the prediction process and transform process. In another embodiment, the leaf nodes of the binary tree are the basic units for the prediction process (i.e., the CU is also used as the PU), however it requires another partitioning from the CU to the TU. In yet another embodiment, the leaf nodes of the binary tree are the basic units for the transform process (i.e., the CU is also used as the TU), but it requires another partitioning from the CU to the PU.

The binary tree structure is more flexible than the quadtree structure since more partition shapes can be supported. Therefore, the binary tree structure has potential to achieve improved coding efficiency. However, the encoding complexity will also be increased due to the larger number of searches needed to identify the best partition shape. In order to balance the complexity and coding efficiency, another embodiment of the present invention combines the quadtree and binary tree structure, which is called as quadtree plus binary tree (QTBT) structure in this disclosure. According to the QTBT structure, a block is firstly partitioned by a quadtree process, where the quadtree splitting can be iterated until the size for a splitting block reaches the minimum allowed quadtree leaf node size or the quadtree partitioning process reaches a maximum allowed quadtree depth. If the leaf quadtree block is not larger than the maximum allowed binary tree root node size, it can be further partitioned by a binary tree partitioning process. The binary tree splitting can be iterated until the size (width or height) for a splitting block corresponding to a binary tree node reaches the minimum allowed binary tree leaf node size (width or height) or the binary tree depth reaches the maximum allowed binary tree depth.

In the QTBT structure, the minimum allowed quadtree leaf node size, the maximum allowed binary tree root node size, the minimum allowed binary tree leaf node width and height, and the maximum allowed binary tree depth can be indicated in the high level syntax such as SPS, PPS or slice header. However, the present invention is not limited thereto.

Figure 5A:
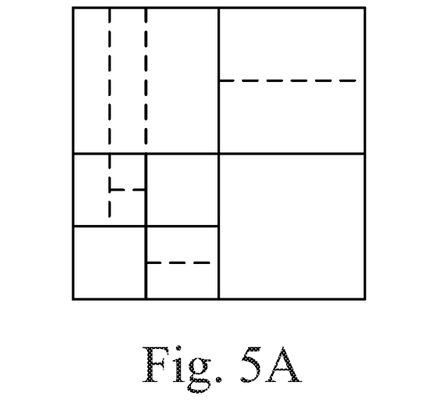
FIG. 5A illustrates an example of quadtree partitioning process plus binary tree partitioning process according to an embodiment of the present invention to partition a block of video data into final sub-blocks for the coding process comprising prediction process, transform process or both.
Figure 5B:
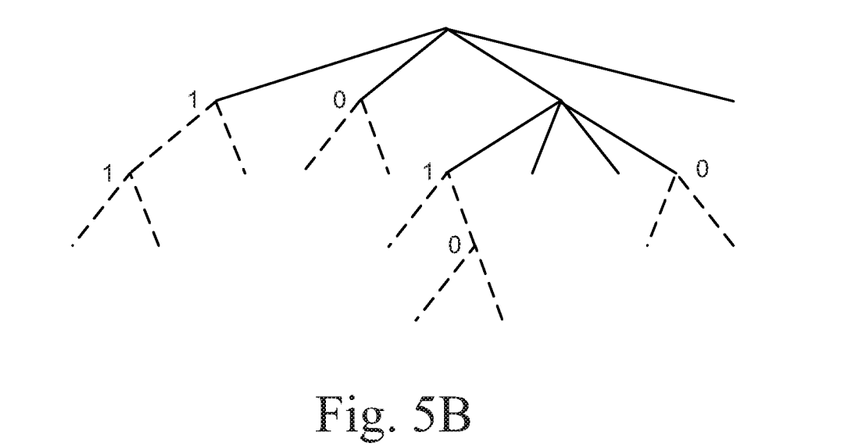
FIG. 5B illustrates an example of a partitioning tree corresponding to the partitioning structure of FIG. 5A, where the solid lines are associated with the quadtree partitioning process and the dashed lines are associated with the binary tree partitioning process.

FIG. 5A illustrates an example of block partitioning and FIG. 5B illustrates the corresponding QTBT. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since it always split a block horizontally and vertically into 4 sub-blocks with an equal size. It is noted that a binary tree partitioning process may result in a same partitioning result as the QTBT process, the two processes are different. The binary tree partitioning process allows more flexible partitioning to better match the local characteristics of underlying video data for coding process comprising prediction process, transform process or both.

The QTBT structure as disclosed above can be used for partitioning a block into multiple smaller blocks (i.e., final sub-blocks) such as partitioning a picture into CTUs, a slice into CTUs, a CTU into CUs, a CU into PUs, a CU into TUs, or a PU into TUs, and so on. For example, the QTBT partitioning process can be applied to partition a CTU into CUs, i.e., the root node of the QTBT is a CTU and the leaf nodes of the QTBT are CUs. The CUs are further processed by prediction and transform coding. In one embodiment, there is no further explicit partitioning from the CU to the PU or from the CU to the TU to simplify the coding process. In other words, the CU is also used as the PU and the TU. Therefore, the leaf nodes of the QTBT are the basic units for the prediction process and transform process. In another embodiment, the leaf nodes of the QTBT are the basic units for the prediction process (i.e., the CU is also used as the PU), however it requires another partitioning from the CU to the TU. In yet another embodiment, the leaf nodes of the QTBT are the basic units for the transform process (i.e., the CU is also used as the TU), but it requires another partitioning from the CU to the PU, in one example, there is only one partition type for partitioning a CU to PUs, so no PU partition information is needed to be signaled to the decoder.

In one example of the QTBT partitioning process, the CTU size is set to 128×128, the minimum allowed quadtree leaf node size is set to 16×16, the maximum allowed binary tree root node size is set to 64×64, the minimum allowed binary tree leaf node width and height both are set to 4, and the maximum allowed binary tree depth is set to 4. The quadtree partitioning process is applied to the CTU first to generate quadtree leaf nodes. The quadtree leaf nodes may have a size from 16×16 (i.e., the minimum allowed quadtree leaf node size) to 128×128 (i.e., the CTU size). If the leaf quadtree node is 128×128, it will not be further split by the binary tree since the size exceeds the maximum allowed binary tree root node size (i.e., 64×64). Otherwise, the leaf quadtree node will be further split by the binary tree. The quadtree leaf node is also the root node for the binary tree partitioning process having the binary tree depth as 0. When the binary tree depth reaches 4, which is the maximum allowed binary tree depth, it implies that no further splitting. When the binary tree node has width equal to 4, it implies no further vertical splitting. Similarly, when the binary tree node has height equal to 4, it implies no further horizontal splitting. The leaf nodes of the QTBT are further processed by prediction (e.g. intra-picture or inter-picture prediction) and transform coding.

In one embodiment of the present invention, the partitioning process combining the quadtree and binary tree structure firstly partitions a block by a binary tree partitioning process, where the binary tree partitioning process can be iterated until a termination criterion is met. If the size of the leaf binary tree block complies with a size constraint, it can be further partitioned by a quadtree partitioning process. The quadtree partitioning process can be iterated until another termination criterion is met. The foregoing termination criteria can be associated with the splitting block size and/or the corresponding tree depth.

In another embodiment, a block of video data is partitioned into final sub-blocks by a multi-level block partitioning process. For example, a first level block partitioning process is a quadtree partitioning process, a second level block partitioning process is a binary tree partitioning process, and a third level block partitioning process is another quadtree partitioning process. Each level of the block partitioning process will be terminated while the splitting block size and/or the corresponding tree depth met a predetermined threshold. The second partitioning processes can be applied if the leaf block generated by the first level block partitioning processes is not larger than a first maximum allowed root node size, while the third partitioning processes can be applied if the leaf block generated by the second level block partitioning processes is not larger than a second maximum allowed root node size.

When the partitioning process disclosed above (e.g. binary tree or QTBT partitioning process) is applied to color video, separate partitioning process can be applied to luma and chroma components for an I-slice. The same partitioning process can be applied to both luma and chroma components for a P and B slice except when certain minimum sizes are reached for the chroma components. In other words, in an I-slice, the luma CTB may use its QTBT partitioning process, and the two chroma CTBs may have a separate QTBT partitioning process. In another example, the two chroma CTBs may also have separate QTBT partitioning process.

The coding performance for a system incorporating an embodiment of the present invention is compared to a conventional HEVC. As mentioned before, the conventional HEVC uses quadtree partitioning process to split a CTU into one or more CUs and a CU into one or more TUs recursively until a termination condition is reached. Also the conventional HEVC uses block partitioning process including to symmetric horizontal or vertical partition to split a CU into one or more PUs. The system incorporating an embodiment of the present system uses the QTBT partitioning process to split a CTU into one or more CUs. The CUs are used for prediction process and transform process without further explicit partitioning. The performance measurement is in terms of BD-rate, which is well known performance measurement in the field of video coding. Based on various text data, the system incorporating an embodiment of the present invention has demonstrated significant improvement over the convention HEVC. The improvement for the luma (i.e., Y component) chroma component (i.e., U and V components) under the All Intra and Random Access coding configuration is over 3% and 8% respectively in term of BD-Rate. However, the encoding running time also increases noticeably while the decoding time only increase slightly.

Figure 6:
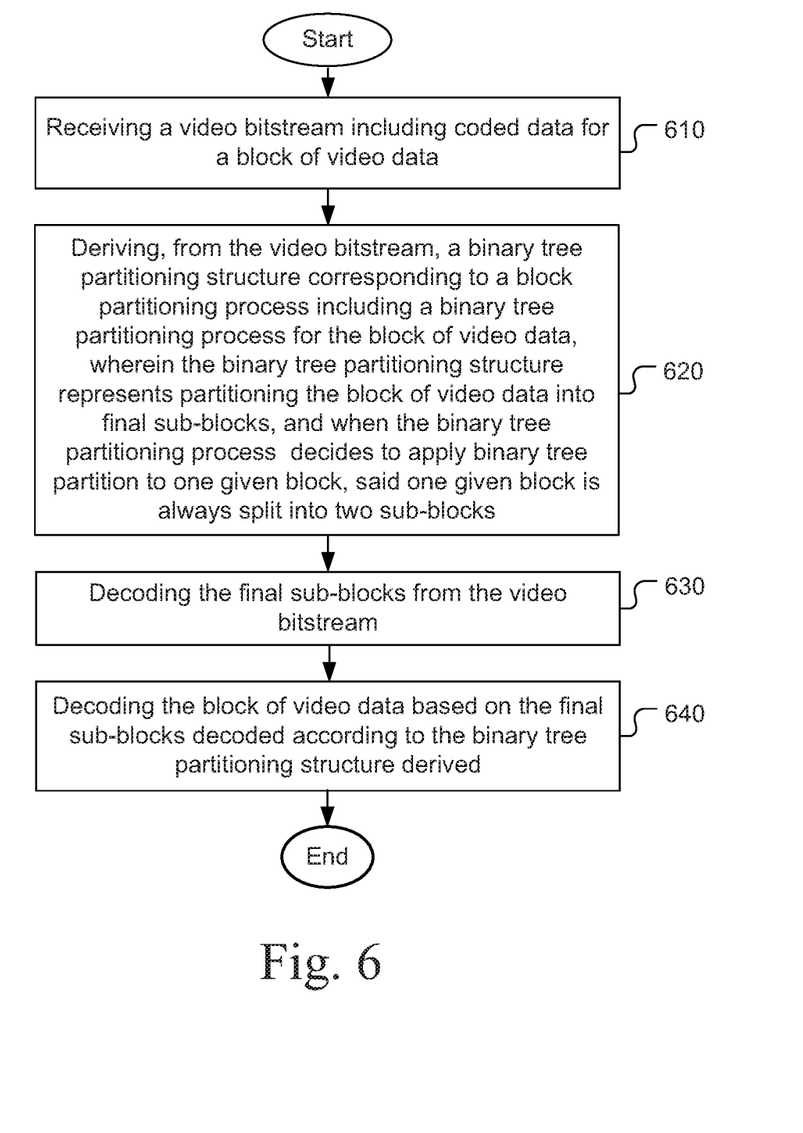
FIG. 6 illustrates an exemplary flowchart for a coding system using a block partitioning process based on a recursive binary tree partitioning process incorporating an embodiment of the present invention to partition a block of video data into final sub-blocks for the coding process comprising prediction process, transform process or both.

FIG. 6 illustrates an exemplary flowchart for a decoding system using block partitioning process incorporating an embodiment of the present invention. The system receives a video bitstream in step 610. The video bitstream may be retrieved from storage such as a computer memory of buffer (RAM or DRAM). The video bitstream may also be received from a processor such as a processing unit or a digital signal. A partitioning structure corresponding to a block partitioning process including a binary tree partitioning process is derived for the block of video data from the video bitstream in step 620. The partitioning structure represents partitioning the block of video data into final sub-blocks, and when the binary tree partitioning process decides to apply binary tree partition to one given block, said one given block is always split into two sub-blocks. The final sub-blocks are decoded based on the video bitstream in step 630. The block of video data is decoded based on the final sub-blocks decoded according to the partitioning structure derived as shown in step 640.

Figure 7:
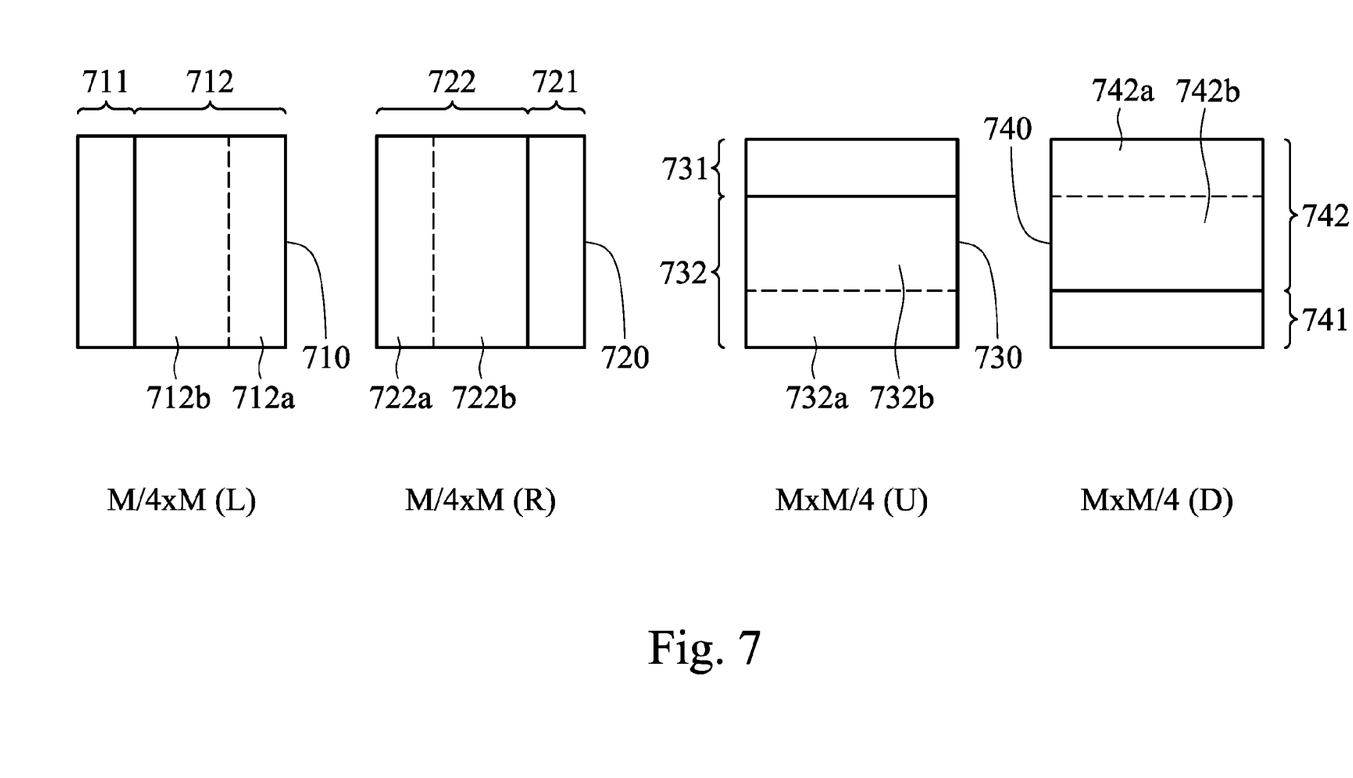
FIG. 7 illustrates an example of available binary tree partition types for the binary tree partitioning process according to an embodiment of the present invention.

In some embodiments, when it is determined that the binary tree partitioning process applies the binary tree partition on a given block based on one of the four asymmetric binary tree partitioning types shown in FIG. 3, the given block is split into two primary sub-blocks with different sizes, one of the primary sub-blocks comprises two inferior sub-blocks, and one of the primary sub-blocks and one of the inferior sub-blocks have the same size. For example, as shown in FIG. 7, when the binary tree partition type is asymmetric horizontal partition with narrower left side, the given block 710 is split into primary sub-blocks 711 and 712, in which the primary sub-blocks 711 corresponds to the narrower left side of the given block 710. The primary sub-blocks 712 further comprises two inferior sub-blocks 712a and 712b, in which the size of the inferior sub-block 712a is the same as the size of the primary sub-block 711. When the binary tree partition type is asymmetric horizontal partition with narrower right side, the given block 720 is split into primary sub-blocks 721 and 722, in which the primary sub-blocks 721 corresponds to the narrower right side of the given block 720. The primary sub-blocks 722 further comprises two inferior sub-blocks 722a and 722b, in which the size of the inferior sub-block 722a is the same as the size of the primary sub-block 721. When the binary tree partition type is asymmetric horizontal partition with narrower upper side, the given block 730 is split into primary sub-blocks 731 and 732, in which the primary sub-blocks 731 corresponds to the narrower upper side of the given block 730. The primary sub-blocks 732 further comprises two inferior sub-blocks 732a and 732b, in which the size of the inferior sub-block 732a is the same as the size of the primary sub-block 731. When the binary tree partition type is asymmetric horizontal partition with narrower lower side, the given block 740 is split into primary sub-blocks 741 and 742, in which the primary sub-blocks 741 corresponds to the narrower lower side of the given block 740. The primary sub-blocks 742 further comprises two inferior sub-blocks 742a and 742b, in which the size of the inferior sub-block 742a is the same as the size of the primary sub-block 741.

When the binary tree partitioning process applies the binary tree partition on a given block, one of the binary tree partition types such as symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side is selected for the given block. For example, the decoder first determines whether the binary tree partitioning process applies the binary tree partition to a current block based on the value of a first indicator. If the value of the first indicator indicates that the binary tree partition is applied on the current block, the decoder then derives the binary tree partition type of the current block based on the value of a second indicator.

In some embodiment, the block partitioning process for a block include the binary tree partitioning process as well as the quadtree partitioning process. In one example, during the partitioning of the block into final sub-blocks, each partition corresponds to one of the binary tree partitioning process and the quadtree partitioning process. The selected partitioning process is indicated by an indicator, and when the binary tree partitioning process is selected, another indicator is used for indicating the corresponding binary tree partition type. In another example, during the partitioning of the block into final sub-blocks, the block first undergoes the quadtree partitioning process so as to generate the quadtree leaf nodes. Each quadtree leaf nodes further undergoes the binary partitioning process so as to generate the final sub-blocks. During the binary partitioning process, an indicator is used for indicating whether a present block is to be split by the binary tree partition, and another indicator is used for indicating the corresponding binary tree partition type if the present block is to be split by the binary tree partition.

Figure 8:
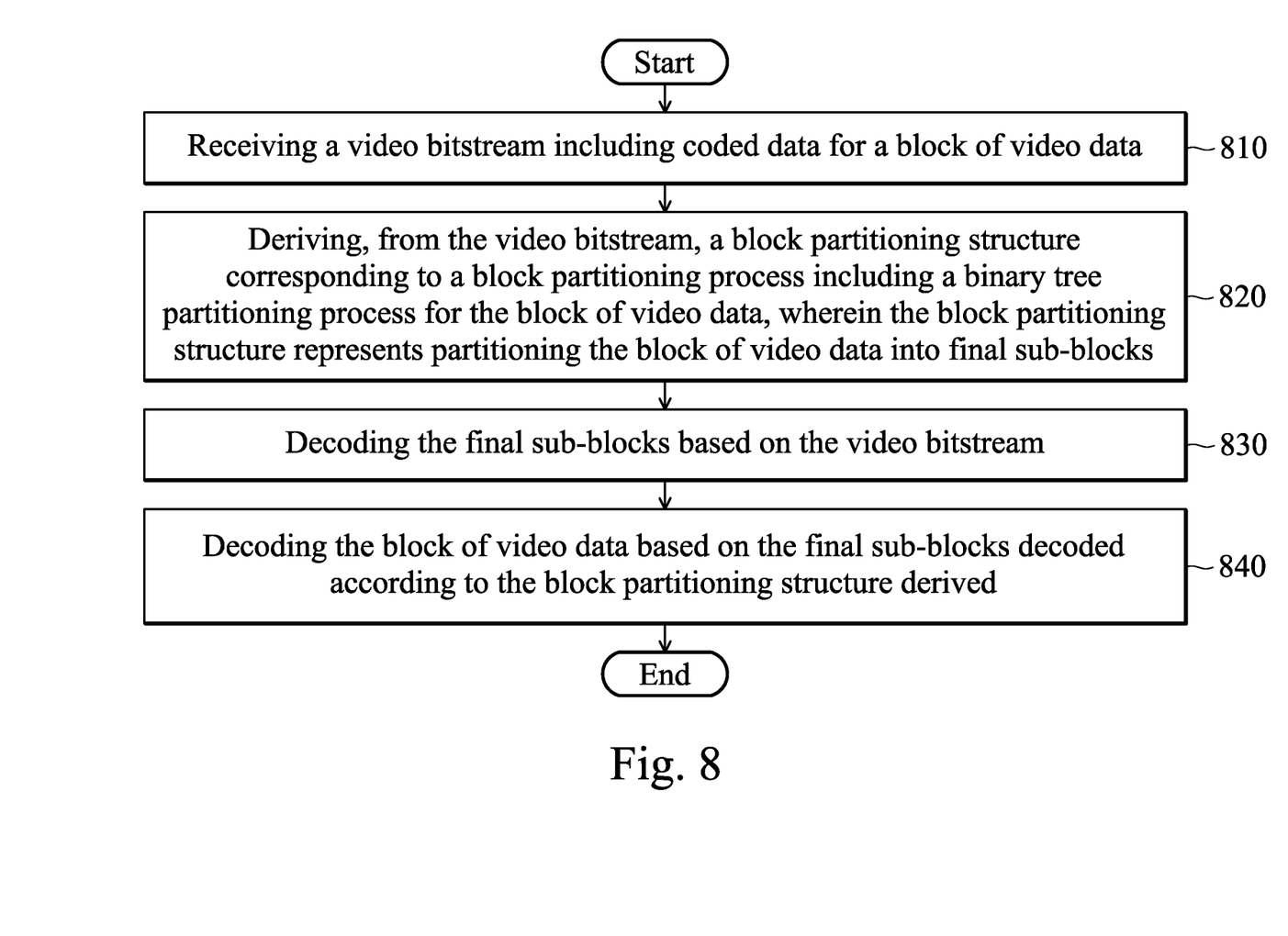
FIG. 8 illustrates an exemplary flowchart for a coding system using a block partitioning process based on a binary tree partitioning process incorporating an embodiment of the present invention to partition a block of video data into final sub-blocks for the coding process comprising prediction process, transform process or both.

FIG. 8 illustrates an exemplary flowchart for a decoding system using block partitioning process incorporating an embodiment of the present invention. The system receives a video bitstream in step 810. The video bitstream may be retrieved from storage such as a computer memory of buffer (RAM or DRAM). The video bitstream may also be received from a processor such as a processing unit or a digital signal. A block partitioning structure corresponding to a block partitioning process including a binary tree partitioning process is derived for the block of video data from the video bitstream in step 820. The partitioning structure represents partitioning the block of video data into final sub-blocks. A first indicator associated with a current block is parsed for determining whether the binary tree partitioning process applies a binary tree partition to the current block, wherein when it is determined that the binary tree partition is applied to the current block, the current block is always split into two primary sub-blocks with same size or two primary sub-blocks with different sizes. The final sub-blocks are decoded based on the video bitstream in step 830. The block of video data is decoded based on the final sub-blocks decoded according to the partitioning structure derived as shown in step 840.

The flowchart shown above is intended to illustrate examples of video coding incorporating an embodiment of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:
receiving a video bitstream including coded data for a block of video data;
deriving, from the video bitstream, a block partitioning structure corresponding to a block partitioning process including a binary tree partitioning process for the block of video data, wherein the block partitioning structure represents partitioning the block of video data into final sub-blocks, and wherein said deriving the block partitioning structure for the block comprises:
parsing a first indicator associated with a current block; and
determining whether the binary tree partitioning process applies a binary tree partition to the current block based on a value of the first indicator, wherein when it is determined that the binary tree partition is applied to the current block, the current block is always split into two primary sub-blocks with same size or two primary sub-blocks with different sizes;
decoding the final sub-blocks based on the video bitstream; and
decoding the block of video data based on the final sub-blocks decoded according to the block partitioning structure derived;
wherein binary tree partition types associated with the binary tree partition comprises at least two of symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side;
wherein a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

2. The method of claim 1, wherein the two primary sub-blocks with different sizes correspond to a first primary sub-block and a second primary sub-block, and the second primary sub-block comprises a first inferior sub-block and a second inferior sub-block.

3. The method of claim 2, wherein the first primary sub-block corresponds to the narrower upper side, the narrower lower side, the narrower left side or the narrower right side of the current block, and the first primary sub-block and the first inferior sub-block have identical size.

4. The method of claim 1, wherein a second indicator is used for the current block to indicate a binary tree partition type associated with the binary tree partition when the binary tree partition is applied to the current block.

5. The method of claim 1, wherein the block of video data corresponds to a coding tree unit (CTU) and the final sub-blocks associated with leaf nodes of the block partitioning structure correspond to coding units (CUs).

6. The method of claim 5, wherein all CUs are used for prediction process and/or transform process respectively without any further explicit partitioning process.

7. The method of claim 1, wherein the block of video data for luma component and non-luma components in an I-slice uses individual block partitioning process or the block of video data for two chroma components in an I-slice uses individual block partitioning process.

8. The method of claim 1, wherein the block partitioning process further includes a quadtree partitioning process, wherein when the quadtree partitioning process decides to apply quadtree partition to one given block, said one given block is always split into four sub-blocks.

9. The method of claim 8, wherein the quadtree partitioning process is firstly applied to the block of video data recursively before the binary tree partitioning process to generate quadtree leaf nodes, and the binary tree partitioning process is applied to one of the quadtree leaf nodes or not based on the first indicator associated with said one of the quadtree leaf nodes.

10. The method of claim 9, wherein the binary tree partition type associated with the two primary sub-blocks with same size is the symmetric horizontal partition or the symmetric vertical partition, and the binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

11. The method of claim 10, wherein the two primary sub-blocks with different sizes correspond to a first primary sub-block and a second primary sub-block, and the second primary sub-block comprises a first inferior sub-block and a second inferior sub-block.

12. The method of claim 11, wherein the first primary sub-block corresponds to the narrower upper side, the narrower lower side, the narrower left side or the narrower right side of the current block, and the first primary sub-block and the first inferior sub-block have identical size.

13. The method of claim 9, wherein the quadtree partitioning process for a selected node is implicitly terminated when the selected node reaches a minimum allowed quadtree leaf node size or quadtree depth associated with the selected node reaches a maximum allowed quadtree depth.

14. The method of claim 13, wherein the minimum allowed quadtree leaf node size, the maximum allowed quadtree depth are specified in high level syntax including sequence parameter set (SPS), picture parameter set (PPS) or slice header.

15. The method of claim 9, wherein the block of video data and the final sub-blocks correspond to coding tree unit (CTU) and coding units (CUs) respectively.

16. The method of claim 15, wherein all CUs are used for prediction process and/or transform process respectively without any further explicit partitioning process.

17. The method of claim 9, wherein the block of video data and the final sub-blocks correspond to picture and coding tree units (CTUs) respectively, slice and CTUs respectively, coding unit (CU) and prediction units (PUs) respectively, coding unit (CU) and transform units (TUs) respectively, or prediction unit (PU) and transform units (TUs) respectively.

18. The method of claim 1, wherein the two primary sub-blocks with different sizes correspond to a first primary sub-block and a second primary sub-block, and the second primary sub-block comprises a first inferior sub-block and a second inferior sub-block.

19. The method of claim 18, wherein the first primary sub-block corresponds to the narrower upper side, the narrower lower side, the narrower left side or the narrower right side of the current block, and the first primary sub-block and the first inferior sub-block have identical size.

20. A method of video encoding, the method comprising:
receiving input data associated with a block of video data;
determining a block partitioning structure corresponding to a block partitioning process including a binary tree partitioning process for the block of video data, wherein the block partitioning structure represents partitioning the block of video data into final sub-blocks, wherein said determining the block partitioning structure for the block comprises:
incorporating a first indicator associated with a current block into a video bitstream, wherein the first indicator indicates whether the binary tree partitioning process applies a binary tree partition to the current block, wherein when it is determined that the binary tree partition is applied to the current block, the current block is always split into two primary sub-blocks with same size or two primary sub-blocks with different sizes; and
applying an encoding process comprising prediction process, transform process or both to the block of video data by applying the encoding process at a level corresponding to the final sub-blocks;
wherein binary tree partition types associated with the binary tree partition comprises at least two of symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side;
wherein a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

21. The method of claim 20, wherein a second indicator is used for the current block to indicate a binary tree partition type associated with the binary tree partition when the binary tree partition is applied to the current block.

22. The method of claim 20, wherein the block of video data corresponds to a coding tree unit (CTU) and the final sub-blocks associated with leaf nodes of the block partitioning structure correspond to coding units (CUs), and all CUs are used for prediction process and/or transform process respectively without any further explicit partitioning process.

23. The method of claim 20, wherein the block partitioning process further includes a quadtree partitioning process, wherein when the quadtree partitioning process decides to apply quadtree partition to one given block, said one given block is always split into four sub-blocks.

24. The method of claim 23, wherein the quadtree partitioning process is firstly applied to the block of video data recursively before the binary tree partitioning process to generate quadtree leaf nodes, and the binary tree partitioning process is applied to one of the quadtree leaf nodes or not based on the first indicator associated with said one of the quadtree leaf nodes.

25. The method of claim 24, wherein a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

26. The method of claim 25, wherein the two primary sub-blocks with different sizes correspond to a first primary sub-block and a second primary sub-block, and the second primary sub-block comprises a first inferior sub-block and a second inferior sub-block.

27. The method of claim 26, wherein the first primary sub-block corresponds to the narrower upper side, the narrower lower side, the narrower left side or the narrower right side of the current block, and the first primary sub-block and the first inferior sub-block have identical size.

28. The method of claim 24, wherein the block of video data and the final sub-blocks correspond to coding tree unit (CTU) and coding units (CUs) respectively, and all CUs are used for prediction process and/or transform process respectively without any further explicit partitioning process.

29. An apparatus for video decoding comprising one or more electronic devices configured to:
   receive a video bitstream including coded data for a block of video data;
   derive, from the video bitstream, a block partitioning structure corresponding to a block partitioning process including a binary tree partitioning process for the block of video data, wherein the block partitioning structure represents partitioning the block of video data into final sub-blocks, and wherein said deriving the block partitioning structure for the block comprises:
   parsing a first indicator associated with a current block; and
   determining whether the binary tree partitioning process applies a binary tree partition to the current block based on a value of the first indicator, wherein when it is determined that the binary tree partition is applied to the current block, the current block is always split into two primary sub-blocks with same size or two primary sub-blocks with different sizes;
   decode the final sub-blocks based on the video bitstream; and
   decode the block of video data based on the final sub-blocks decoded according to the block partitioning structure derived;
   wherein binary tree partition types associated with the binary tree partition comprises at least two of symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side;
   wherein a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

30. An apparatus for video encoding comprising one or more electronic devices configured to:
   receive input data associated with a block of video data;
   determine a block partitioning structure corresponding to a block partitioning process including a binary tree partitioning process for the block of video data, wherein the block partitioning structure represents partitioning the block of video data into final sub-blocks, wherein said determining the block partitioning structure for the block comprises:
   incorporating a first indicator associated with a current block into a video bitstream, wherein the first indicator indicates whether the binary tree partitioning process applies a binary tree partition to the current block, wherein when it is determined that the binary tree partition is applied to the current block, the current block is always split into two primary sub-blocks with same size or two primary sub-blocks with different sizes; and
   apply an encoding process comprising prediction process, transform process or both to the block of video data by applying the encoding process at a level corresponding to the final sub-blocks;
   wherein binary tree partition types associated with the binary tree partition comprises at least two of symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side;
   wherein a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

31. A non-transitory computer readable medium storing a computer-executable program, the computer-executable program, when executed, causing a decoder to perform the following steps:
   receiving a video bitstream including coded data for a block of video data;
   deriving, from the video bitstream, a block partitioning structure corresponding to a block partitioning process including a binary tree partitioning process for the block of video data, wherein the block partitioning structure represents partitioning the block of video data into final sub-blocks, and wherein said deriving the block partitioning structure for the block comprises:
   parsing a first indicator associated with a current block; and determining whether the binary tree partitioning process applies a binary tree partition to the current block based on a value of the first indicator, wherein when it is determined that the binary tree partition is applied to the current block, the current block is always split into two primary sub-blocks with same size or two primary sub-blocks with different sizes;

decoding the final sub-blocks based on the video bitstream; and decoding the block of video data based on the final sub-blocks decoded according to the block partitioning structure derived;

wherein binary tree partition types associated with the binary tree partition comprises at least two of symmetric horizontal partition, symmetric vertical partition, asymmetric horizontal partition with narrower upper side, asymmetric horizontal partition with narrower lower side, asymmetric vertical partition with narrower left side and asymmetric vertical partition with narrower right side;

wherein a binary tree partition type associated with the two primary sub-blocks with same size is the symmetric horizontal partition or the symmetric vertical partition, and a binary tree partition type associated with the two primary sub-blocks with different sizes is one of the asymmetric horizontal partition with narrower upper side, the asymmetric horizontal partition with narrower lower side, the asymmetric vertical partition with narrower left side and the asymmetric vertical partition with narrower right side.

* * * * *